US011663640B2

(12) United States Patent
Breaux et al.

(10) Patent No.: US 11,663,640 B2
(45) Date of Patent: May 30, 2023

(54) SYSTEMS AND METHODS FOR AUTOMATIC SUBSCRIPTION-BASED ORDERING OF PRODUCT COMPONENTS

(71) Applicant: Rovi Guides, Inc., San Jose, CA (US)

(72) Inventors: Denisse Breaux, Lansdale, PA (US); Matthew Wildrick, Doylestown, PA (US); Evangeline Castaneda, West Chester, PA (US); Mark Thompson, Havertown, PA (US)

(73) Assignee: ROVI GUIDES, INC., San Jose, CA (US)

( * ) Notice: Subject to any disclaimer, the term of this patent is extended or adjusted under 35 U.S.C. 154(b) by 13 days.

(21) Appl. No.: 17/400,375

(22) Filed: Aug. 12, 2021

(65) Prior Publication Data

US 2021/0374818 A1    Dec. 2, 2021

Related U.S. Application Data

(63) Continuation of application No. 16/222,917, filed on Dec. 17, 2018, now Pat. No. 11,120,489.

(51) Int. Cl.
G06Q 30/00 (2023.01)
G06Q 30/0601 (2023.01)
G06Q 10/083 (2023.01)

(52) U.S. Cl.
CPC ....... *G06Q 30/0613* (2013.01); *G06Q 10/083* (2013.01); *G06Q 30/0621* (2013.01); *G06Q 30/0635* (2013.01)

(58) Field of Classification Search
USPC ...................................................... 705/26.41
See application file for complete search history.

(56) References Cited

U.S. PATENT DOCUMENTS

| 6,212,262 B1* | 4/2001 | Kamel | H04M 3/4878 379/93.12 |
| 8,429,026 B1* | 4/2013 | Kolawa | G06Q 30/00 705/26.7 |
| 10,417,605 B1* | 9/2019 | Liu | G06Q 10/0835 |
| 11,120,489 B2* | 9/2021 | Breaux | G06Q 30/0621 |

(Continued)

OTHER PUBLICATIONS

Panigraphy S.K., Jena D., Jena S.K., A Secure e-Shopping Using Voice Ordering, 2010, Springer, Berlin, Heidelberg, Information Processing and Management, vol. 70., pp. 233-237. (Year: 2010).*

(Continued)

*Primary Examiner* — Jeffrey A. Smith
*Assistant Examiner* — Brittany E Bargeon
(74) *Attorney, Agent, or Firm* — Haley Guiliano LLP

(57) ABSTRACT

Systems and methods are disclosed herein for automatic subscription-based ordering of product components. During display of media content, the system receives a voice input and determines that the voice input indicates interest in a product. The system identifies the components required to create the product and identifies a subscription to an automated shopping service. Upon identifying the subscription, the system determines whether required components are available via the automated shopping service. Further, the system excludes components that were previously purchased via the automated shopping service, and the system automatically places an order through the automated shopping service for the remaining components.

20 Claims, 8 Drawing Sheets

(56) References Cited

U.S. PATENT DOCUMENTS

| | | | |
|---|---|---|---|
| 2005/0132420 A1* | 6/2005 | Howard | G06F 3/017 |
| | | | 348/E5.103 |
| 2015/0073925 A1* | 3/2015 | Renfroe | G06Q 10/087 |
| | | | 705/15 |
| 2015/0132420 A1 | 5/2015 | Martinez-Serna Villagran et al. | |
| 2015/0156061 A1 | 6/2015 | Saxena et al. | |
| 2015/0281793 A1* | 10/2015 | Wheatley | H04N 21/4882 |
| | | | 725/60 |
| 2016/0205442 A1 | 7/2016 | Yee et al. | |
| 2019/0378081 A1* | 12/2019 | Swartz | G06Q 10/083 |

OTHER PUBLICATIONS

Panigraphy et al., "A Secure e-Shopping Using Voice Ordering,", Information Processing and Management, 70:233-237 (2010).

* cited by examiner

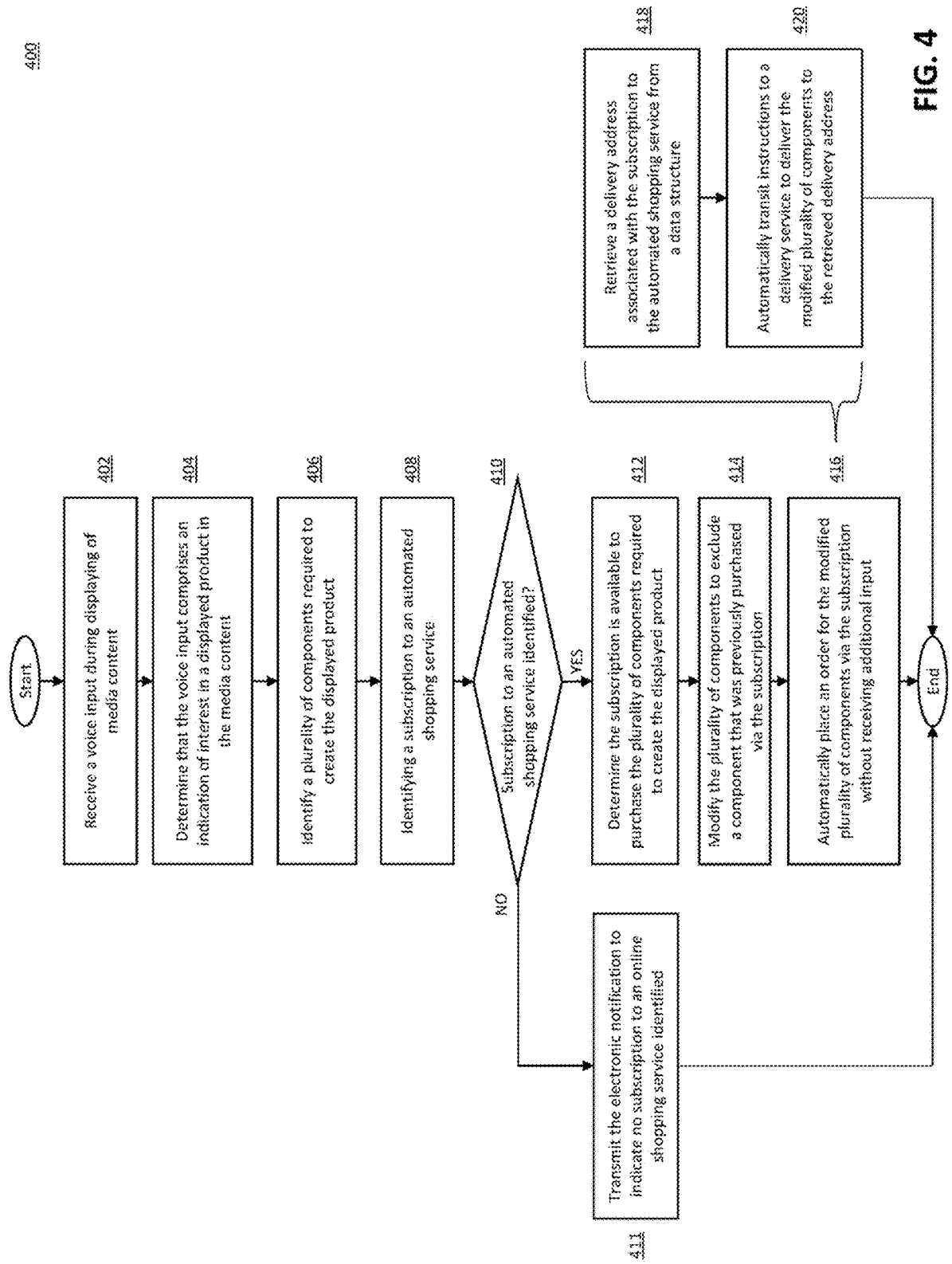

US 11,663,640 B2

SYSTEMS AND METHODS FOR AUTOMATIC SUBSCRIPTION-BASED ORDERING OF PRODUCT COMPONENTS

CROSS-REFERENCE TO RELATED APPLICATION

This application is a continuation of U.S. patent application Ser. No. 16/222,917, filed Dec. 17, 2018, which is hereby incorporated by reference herein in its entirety.

BACKGROUND

The present disclosure is directed to techniques for computer-based automatic product ordering. In particular, techniques are described for improved automatic subscription-based ordering of product components.

SUMMARY

One approach for subscription-based product ordering includes passively monitoring a user to determine when the user is interested in a product. For example, a user may utter a noise (e.g., "wow") when he sees a product on in a video on his tablet. Under this approach, the product can be recommended for ordering via the subscription service. However, this approach will fail if the desired product is unavailable for ordering via the subscription service.

Accordingly, systems and methods are disclosed for automatic subscription-based ordering of product components. During display of media content, the system receives a voice input and determines that the voice input indicates interest in a product. The system identifies the components required to create the product and identifies a subscription to an automated shopping service. Upon identifying the subscription, the system determines whether required components are available via the automated shopping service. Further, the system excludes components that were previously purchased via the automated shopping service, and the system automatically places an order through the automated shopping service for the remaining components.

A number of techniques for modifying the components to exclude a component from the order are also disclosed. For example, the system may determine a component was previously purchased within a recent time period, and consequently that component is excluded. In another disclosed approach, the system determines that a component required to create the product is unavailable for purchase and, using the automated shopping service, identifies a substitute component. The system may further identify potential substitute components that are similar in price and specification to the component that is unavailable.

Various techniques for further analyzing the received voice input are disclosed. For example, the system may identify a time period of when the voice input was received. The system may then determine that the voice input indicates interest in a product during the that time period. In another example, the system determines whether the voice input matches a voice signature of a user. If so, the system determines a particular automated shopping service to which that user is subscribed. Upon determining the particular automated shopping service, the system orders the components for the user.

These systems and methods provide solutions in instances where the desired product is unavailable, and in instances when the user would prefer to create the desired product from its components. Efficiency is enhanced for subscription-based ordering as users are not required to manually identify and actively participate in the ordering process. The automated ordering process is further streamlined as the user need not be aware of their inventory of supplies required to create a number of potential desirable products, as these systems and methods automatically determine recent purchase history to effectively only order the required components for the desired product. The provided systems and methods further function to reduce redundant purchases of product components by automatically placing an order through the automated shopping service for only the components for which the user has not recently purchased.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 4 is an illustrative flowchart of a process for automatic subscription-based ordering of product components, in accordance with some embodiments of the disclosure;

DETAILED DESCRIPTION

Figure 1:
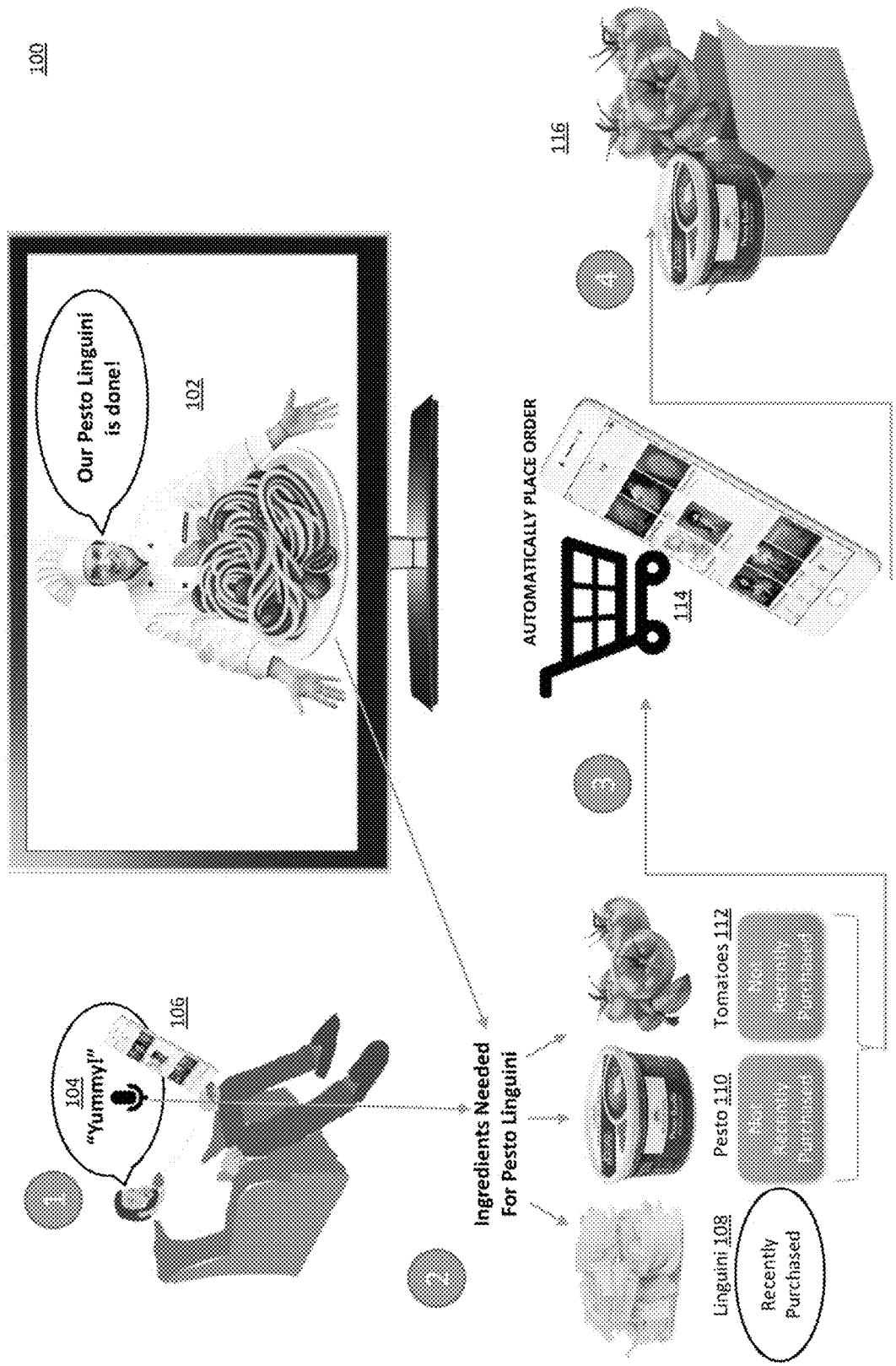
FIG. 1 shows an illustrative diagram of a voice command being received and analyzed by a product ordering server to automatically place an order in an automated shopping service for the missing components of a displayed product, in accordance with some embodiments of the disclosure.

FIG. 1 shows an illustrative diagram 100 of a voice command being received and analyzed by a product ordering server to automatically place an order in an automated shopping service for the missing components of a displayed product, in accordance with some embodiments of the disclosure. As an illustrative example, in section (1) of FIG. 1, a user is viewing a cooking show on television 102. This particular cooking show is preparing pesto linguini. A picture of the dish appears on the show, as well as the chef stating "Our Pesto Linguini is done!" The user, seeing and hearing this, remarks "Yummy!" 104 which is received by the user's smartphone 106 via microphone at the approximate time of the dish being displayed and the chef's statement being made. In this instance the smartphone may be connected to a cloud server that functions as the product ordering server. The product ordering server then determines that the voice input (e.g., "Yummy!") comprises an indication of interest in a displayed product in the media content, namely the pesto linguini. A voice input may be any type of vocal output from a user. The media content may be played on any type of device whether it be audio, video, audio and video, virtual reality, augmented reality, or other similar type of media.

Some techniques of determining the indication of interest include matching the voice input as a keyword to an associative data structure of keywords which are deemed to represent an indication of interest. In such techniques, the voice input may use parsing techniques to extract one or more keywords from the voice input for keyword analysis and/or other related analyses. In some variants of the system, the voice input comprising the indication of interest includes an excited utterance or an instruction to purchase the plurality of components required to create the displayed product. For example, an excited utterance may be a lexical or non-lexical utterance, an interjection, or any other type of excited vocal output which expresses interest for the displayed product.

Other techniques for determining the indication of interest provide for analysis of the inflections of the voice input. Patterns of inflections may be associated with positive expressions which are equated to an indication of interest. For example, a voice inflection that matches a specific pattern of an acoustic profile (e.g., match through pitch, frequency, or similar metrics) may be deemed an indication of interest. The acoustic profiles may be stored in an associative data structure. Voice comparison analysis techniques may be implemented to compare the received voice input of the user to acoustic profiles to determine a degree of similarity. If a threshold degree of similarity is met, the voice input would be associated with the acoustic profile and the corresponding indication/non-indication of interest.

In other embodiments, monitoring of passive inputs of the user may be used to determine the indication of interest, or be used in conjunction with the voice input to determine the indication of interest. For example, monitoring passive inputs of the user may include image/video monitoring of facial expressions of the user in reaction to specific displayed products shown on media content. Specific facial expressions may be associated with an indication of interest. The associations between facial expressions and indications of interest may be stored in an associative data structure. As an illustrative example, a case may arise where passive inputs of the user show that the user raised their eyebrows while stating "Yummy!" and the acoustic profile of this voice input does not meet the threshold for matching the acoustic profile to render an indication of interest. However, the level of similarity found in the acoustic profile in addition to the raised eyebrows, which are deemed an indication of interest, would render a determination that the user has expressed an indication of interest.

In other variants of the system, the monitoring of passive inputs by the product ordering server includes monitoring biometric inputs of the user. For example, a user may be wearing a biometric network-connected device (e.g., a wearable device such as a smart-watch), which monitors the heartrate of the user. This information may be used to determine an indication of interest, or be used in conjunction with the voice input to determine the indication of interest. The biometric profile received (e.g., heartrate) may be associated with a biometric profile which suggests an indication of interest. These biometric profiles may be stored in the associative data structure.

The indication of interest is in relation to a displayed product. The product ordering server identifies which object within the media content is the displayed product. In one approach, the system retrieves metadata associated with the media content and selects the relevant item from the metadata as the displayed product based on the indication of interest, the time stamp of the indication of interest corresponding to the media content, and other factors. Metadata may include tags associated with the media content, closed-captioning information, crowd-sourced information regarding the media content, time-based metadata from the content source or a third-party source, and similar media content-related information. In some embodiments, the product ordering server may retrieve a user profile to further incorporate information to select the item that is most likely of interest to the user.

In section (2) of FIG. 1, the product ordering server identifies which components are required to create the displayed product. The product ordering server may transmit the displayed product information to an associative data structure which provides the corresponding components required to create the displayed product. The associative data structure may contain recipes, building instructions, blueprints, engineering drawings, chemical compositions, or how-to-guides for creating, assembling, or deriving specific products. In the current example, the product ordering server sends "pesto linguini" to the associative data structure which returns the following ingredients required to cook the dish: linguini 108, pesto 110, and tomatoes 112.

After determining the components required for creation of the displayed product, the product ordering server identifies a subscription to an automated shopping service. Various techniques disclosed herein may be implemented to identify the automated shopping service. In some embodiments, the product ordering server may determine whether the voice input matches a voice signature of a user. If so, the product ordering server determines which particular subscription service the user is subscribed to. After finding a match, the product ordering server identifies the particular subscription service as the automated shopping service to be used for automated ordering. In the current example, the server recognizes the user's voice and associates the user with a particular automated shopping service. In another approach, the product ordering server may more simply retrieve a user profile and determine if any subscription services for automated shopping services are associated with this particular user account.

The product ordering server determines that the subscription to the automated shopping service is available to purchase the components required to create the displayed product. The server transmits information related to the required components to the subscription to determine whether the components are available from the automated shopping service. The product ordering server then modifies the components to exclude a component that was previously purchased via the subscription. Returning to the current example, the linguini 108 had been previously purchased, while both pesto 110 and tomatoes 112 had not been recently purchased. Thus, the order to the subscription is modified to exclude the linguini as the user already has the linguini required to create pesto linguini. In some embodiments, a predetermined time may be utilized by the product ordering server to determine whether the product had been purchased recently where the predetermined time varies based on the specific component. For example, a predetermined time for previously purchased tomatoes may be two weeks, while the predetermined time for previously purchased linguini may be two months.

The product ordering server, after determining the modified components, places an order via the subscription without receiving additional input. In section (3) of FIG. 1, the orders for pesto and tomatoes are automatically added to the electronic shopping cart 114 without the user having to manually add the components into the smartphone or other electronic device. In some embodiments, the product ordering server retrieves a delivery address associated with the subscription from a data structure (e.g., the associative data structure), a user profile, or from location-based information. In section (4) of FIG. 1, the order for pesto and tomatoes are automatically delivered in a box 116 to the user's home address. The product ordering server may transmit a notification to a user account of the subscription confirming delivery of the components to the delivery address. In the current example, the user may receive an instant message on their smartphone regarding the automatic delivery at their address when the components of the displayed product arrive.

In some instances when using the proposed system, one of the required components for the displayed product may be unavailable. Upon a determination of this component being unavailable, a substitute component is identified for order. Numerous methods disclosed herein may be used to select the substitute component for order. For example, the substitute component may be one that has a similar price and/or similar specification to the component which is unavailable. In another approach, the substitute component may be provided from a data structure using one or more factors including, but not limited to, similarity of product, similarity of brand, crowd-sourced information regarding similarity of product, previous user buying history, and products with similar sub-components.

Figure 2:
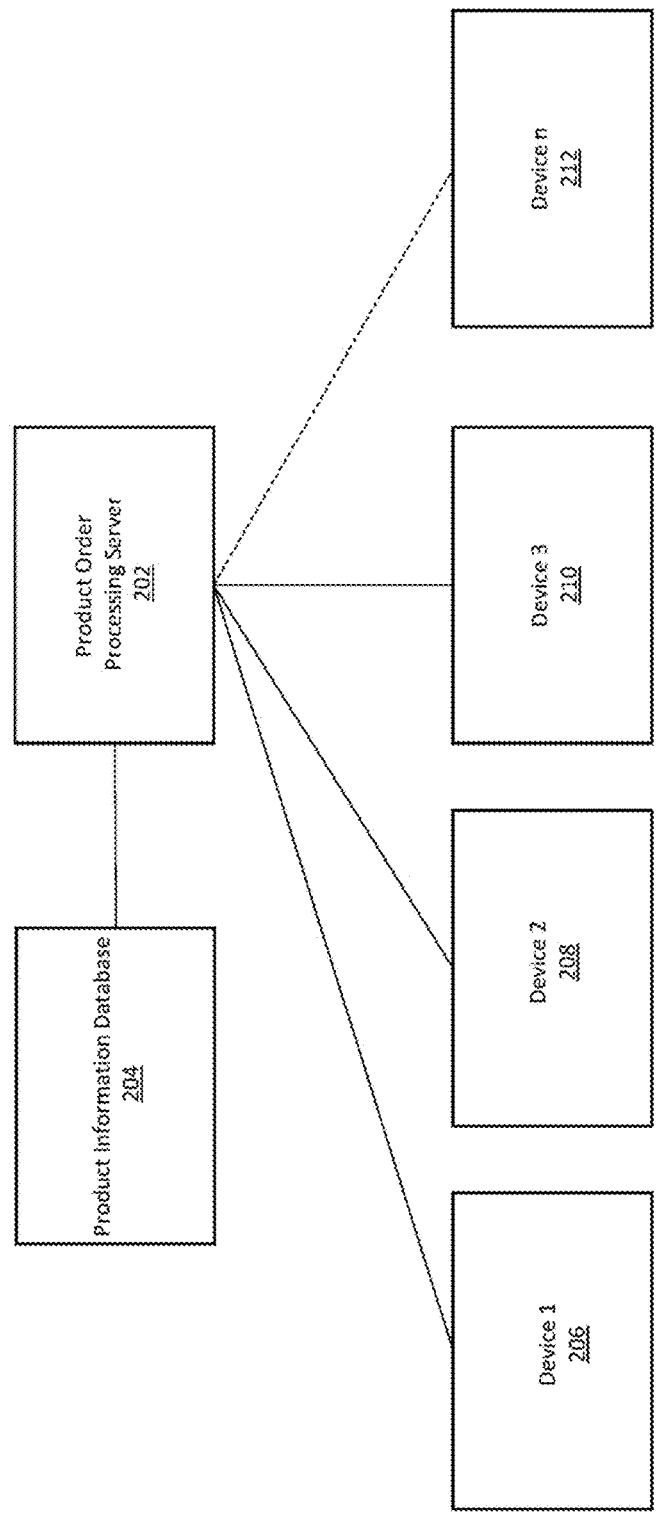
FIG. 2 shows an illustrative system diagram of the product ordering server, associative data structure, multiple devices, and automated shopping service in accordance with some embodiments of the disclosure.

FIG. 2 shows an illustrative system diagram 200 of the product ordering server, associative data structure, multiple devices, and automated shopping service, in accordance with some embodiments of the disclosure. The product ordering server 202 may be any hardware that provides for the functionality of the disclosed techniques for automatic subscription-based ordering of product components. The product ordering server may be communicatively coupled to multiple devices (e.g., device 1 (206), device 2 (208), device 3 (210), device n (212)). The product ordering server may be communicatively coupled to an associative data structure 204. The product ordering server may also be communicatively coupled to one or more automated shopping services. In some embodiments, the product ordering server is communicatively coupled to a product information data structure. A further detailed disclosure on the product ordering server can be seen in FIG. 3A which shows an illustrative block diagram of the product ordering server, in accordance with some embodiments of the disclosure.

In some embodiments, the product ordering server may be embedded within a device having shared hardware of the device. For example, the product ordering server may be part of a personal computer, smartphone, tablet, wearable technology product or other electronic device within a home network. In other approaches, the product ordering server may be remote from the home network where the server resides in a cloud configuration, receiving information from multiple devices from a home, work, or other remote network. In yet another approach, the product ordering server may be within one of the devices, 206, 208, 210, or 212. A further detailed disclosure on the product ordering server can be seen in FIG. 3B which shows an illustrative block diagram of the product ordering server, in accordance with some embodiments of the disclosure. Any of the system modules (e.g., product ordering server, associative data structure, devices, and/or automated shopping services) may be any combination of shared or disparate hardware pieces that are communicatively coupled.

The devices (e.g., device 1 (206), device 2 (208), device 3 (210), and/or device n (212)) may be any device that may receive voice input. For example, the device may be any personal computer, smartphone, tablet, electronic assistant, smart-home appliance, television, wearable technology product, a variety of consumer electronics, industrial equipment, security system, digital twin system, and/or similar system. The voice input may be detected by microphone, vocal input technology, or other similar technology and sent to the product ordering server through a communication means (e.g., network connection, Bluetooth, hardwire, electric wire, phone cable, or any other communicative means). The devices may also provide biometric data to the product ordering server (e.g., providing heart rate, breathing rate, sweat analysis, fluid analysis, and other biometric analysis). The devices may also include audio and video capabilities to record passive movements of the user.

The associative data structure 204 may be any database, server, or computing device that contains memory for storing entries to associate any relevant modelling information to the vocal input. For example, the associative data structure may store acoustic profiles of one or more users, product descriptions, substitute product equivalents, user profile information, user subscription to automated shopping service information, and other types of information. The associative data structure may be remote from the product ordering server, or, alternatively, may be part of the hardware of the product ordering server.

The automated shopping service 214 may be any electronic service that provides e-commerce services. For example, the automated shopping services may provide a marketplace to purchase meals and ingredients for meals. The automated shopping services may be communicatively coupled to the product ordering server to interface with the server (e.g., by network connection, Bluetooth, hardwire, electric wire, phone cable, or any other communicative means). In some embodiments, the product ordering server interfaces with the one or more automated shopping services using a specific subscription of the respective automated shopping service.

Figure 3A:
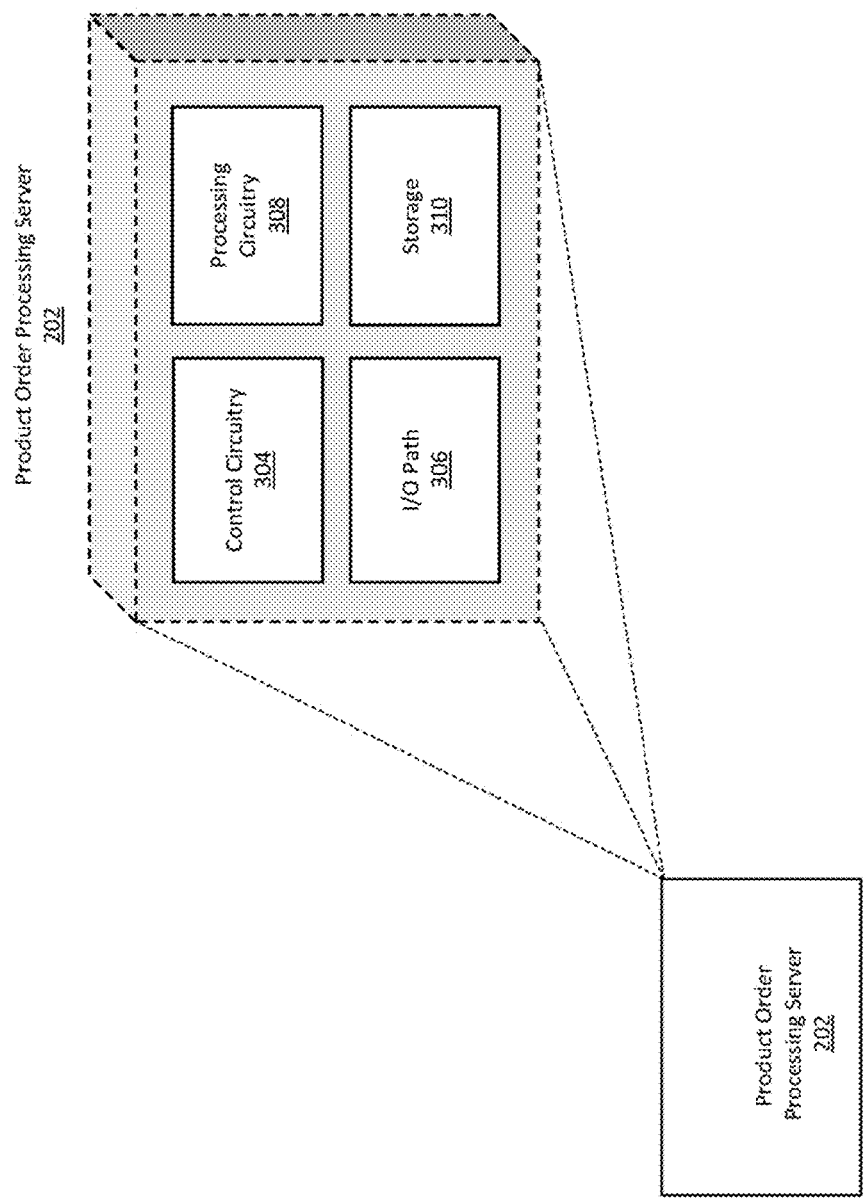
FIG. 3A shows an illustrative block diagram of the product ordering server, in accordance with some embodiments of the disclosure.

FIG. 3A shows an illustrative block diagram 300 of the product ordering server 202, in accordance with some embodiments of the disclosure. In some embodiments, the product ordering server may be communicatively connected to a user interface. In some embodiments, the product ordering server may include processing circuitry, control circuitry, and storage (e.g., RAM, ROM, hard disk, removable disk, etc.). The product ordering server may include an input/output path 306. I/O path 306 may provide device information or other data over a local area network (LAN) or wide area network (WAN), and/or other content and data to control circuitry 304, which includes processing circuitry 308 and storage 310. Control circuitry 304 may be used to send and receive commands, requests, and other suitable data using I/O path 306. I/O path 306 may connect control circuitry 304 (and specifically processing circuitry 308) to one or more communications paths.

Control circuitry 304 may be based on any suitable processing circuitry, such as processing circuitry 308. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a product ordering server stored in memory (e.g., storage 310).

Memory may be an electronic storage device provided as storage 310 which is part of control circuitry 304. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The product ordering server 302 may be coupled to a communications network. Communications network may be one or more networks including the Internet, a mobile phone network, mobile voice or data network (e.g., a 5G, 4G or LTE network), mesh network, peer-2-peer network, cable network, or other types of communications network or combinations of communications networks. Paths may separately or together include one or more communications paths, such as, a satellite path, a fiber-optic path, a cable path, a path that supports Internet communications, free-space connections (e.g., for broadcast or other wireless signals), or any other suitable wired or wireless communications path or combination of such paths.

Figure 3B:
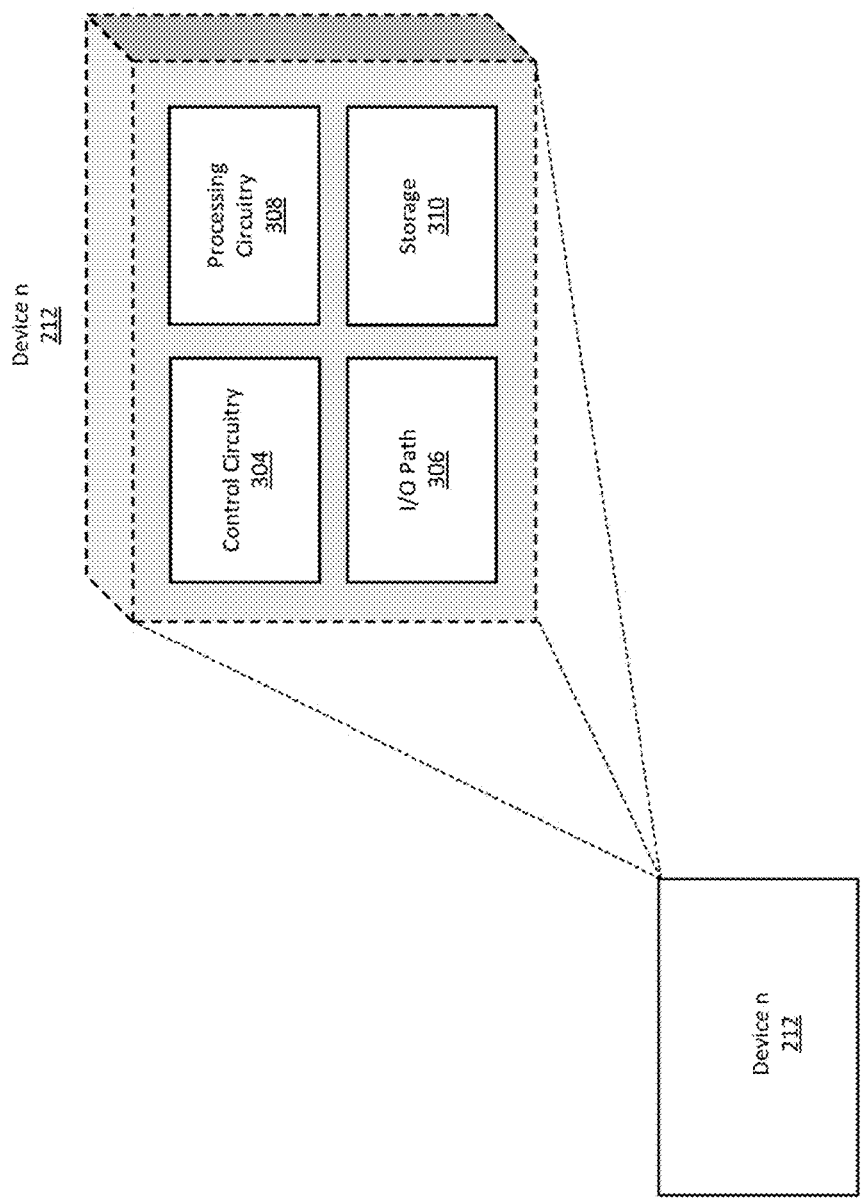
FIG. 3B shows an illustrative block diagram of an exemplary device, in accordance with some embodiments of the disclosure.

FIG. 3B, similar to FIG. 3A, shows an illustrative block diagram 301 of the device n 212, in accordance with some embodiments of the disclosure. In some embodiments, the device n may perform the operations of the product ordering server and may be communicatively connected to a user interface. In similar schema to FIG. 3A, device n includes processing circuitry 308, control circuitry 304, and storage 310 (e.g., RAM, ROM, hard disk, removable disk, etc.) and an I/O path 306.

FIG. 4 is an illustrative flowchart of a process for automatic subscription-based ordering of product components, in accordance with some embodiments of the disclosure.

Process 400, and any of the following processes, may be executed by control circuitry 304 (e.g., in a manner instructed to control circuitry 304 by the product ordering server). Control circuitry 304 may be part of product ordering server 202, or of a remote server separated from the product ordering server by way of a communications network, or distributed over a combination of both.

At 402, the product ordering server, by control circuitry 304, receives a voice input while displaying media content. The product ordering server may receive the voice input through the I/O path 306, which may be coupled to another device, microphone, or an audio sensor to detect and receive the voice input. At 404, the product ordering server, by control circuitry 304, determines that the voice input comprises an indication of interest in a displayed product in the media content. In some embodiments, the product ordering server may interface with one or more devices through the I/O path 306 to receive passive inputs of the user in addition to the voice input. At 406, the product ordering server, by control circuitry 304, identifies a plurality of components required to create the displayed product. The product ordering server may retrieve information (e.g., metadata regarding the desired product) from the associative data structure 204 through the I/O path 306 to aid in identification of the plurality of components required to create the displayed product. At 408, the product ordering server, by control circuitry 304, identifies a subscription to an automated shopping service. The product ordering server may retrieve information (e.g., user profile information) from the associative data structure 204 through the I/O path 306 to aid in identification of the subscription to an automated shopping service. If, at 410, control circuitry 304 determines "No," a subscription to an automated shopping service could not be identified, the process continues to 411. At 411, the product ordering server, by control circuitry 304, transmits the electronic notification to indicate no subscription to an online shopping service identified and the process advances to End.

If, at 410, control circuitry determines "Yes," a subscription to an automated shopping service is identified, the process advances to 412. At 412, the product ordering server, by control circuitry 304, determines the subscription is available to purchase the plurality of components required to create the displayed product. The product ordering server may utilize I/O path 306 to interface with the associative data structure 204 or a subscription-based interface to determine if the subscription is available to purchase the plurality of components required to create the displayed product.

At 414, the product ordering server, by control circuitry 304, modifies the plurality of components to exclude a component that was previously purchased via the subscription. In some embodiments, processing circuitry 308 may be utilized to modify the plurality of components to exclude a component that was previously purchased via the subscription.

At 416, the product ordering server, by control circuitry 304, automatically places an order for the modified plurality of components via the subscription without receiving additional input. In some embodiments, at 418, the product ordering server, by control circuitry 304, retrieves a delivery address associated with the subscription to the automated shopping service from a data structure. In some embodiments, the product ordering server, utilizes the I/O path 306 to receive the delivery address from the associative data structure 204 or a device 212 (e.g., device n). At 420, the product ordering server, by control circuitry 304, automatically transits instructions to a delivery service to deliver the modified plurality of components to the retrieved delivery address.

Figure 5:
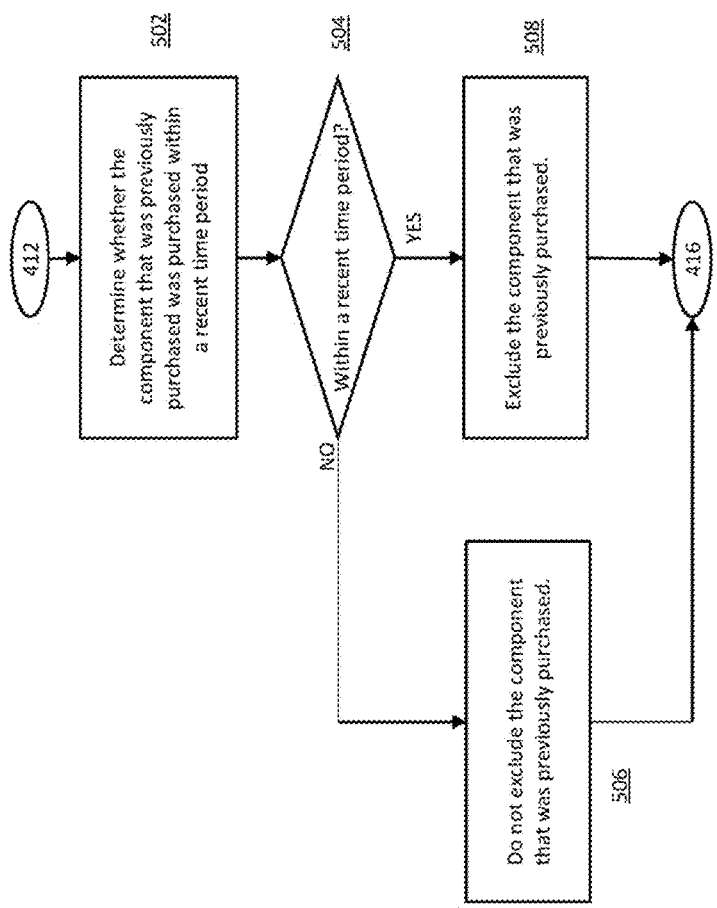
FIG. 5 is an illustrative flowchart of a process for modifying the plurality of components to exclude a component that was previously purchased via the subscription to the automated shopping service, in accordance with some embodiments of the disclosure.

FIG. 5 is an illustrative flowchart of a process 500 for modifying the plurality of components to exclude a component that was previously purchased via the subscription to the automated shopping service, in accordance with some embodiments of the disclosure. At 502, the product ordering server, by control circuitry 304, determines whether the component that was previously purchased was purchased within a recent time period. In some embodiments, the product ordering server receives information of previous purchases from the associative data structure 204 through the I/O path 306. If, at 504, control circuitry 304 determines "No," the component that was previously purchased was not purchased within a recent time period, the process continues to 506. At 506, the product ordering server, by control circuitry 304, does not exclude the component that was previously purchased and advances to previous detailed step 416.

If, at 504, control circuitry determines "Yes," the component that was previously purchased was purchased within a recent time period, the process continues to 508. At 508, the product ordering server, by control circuitry 304, excludes the component that was previously purchased.

Figure 6:
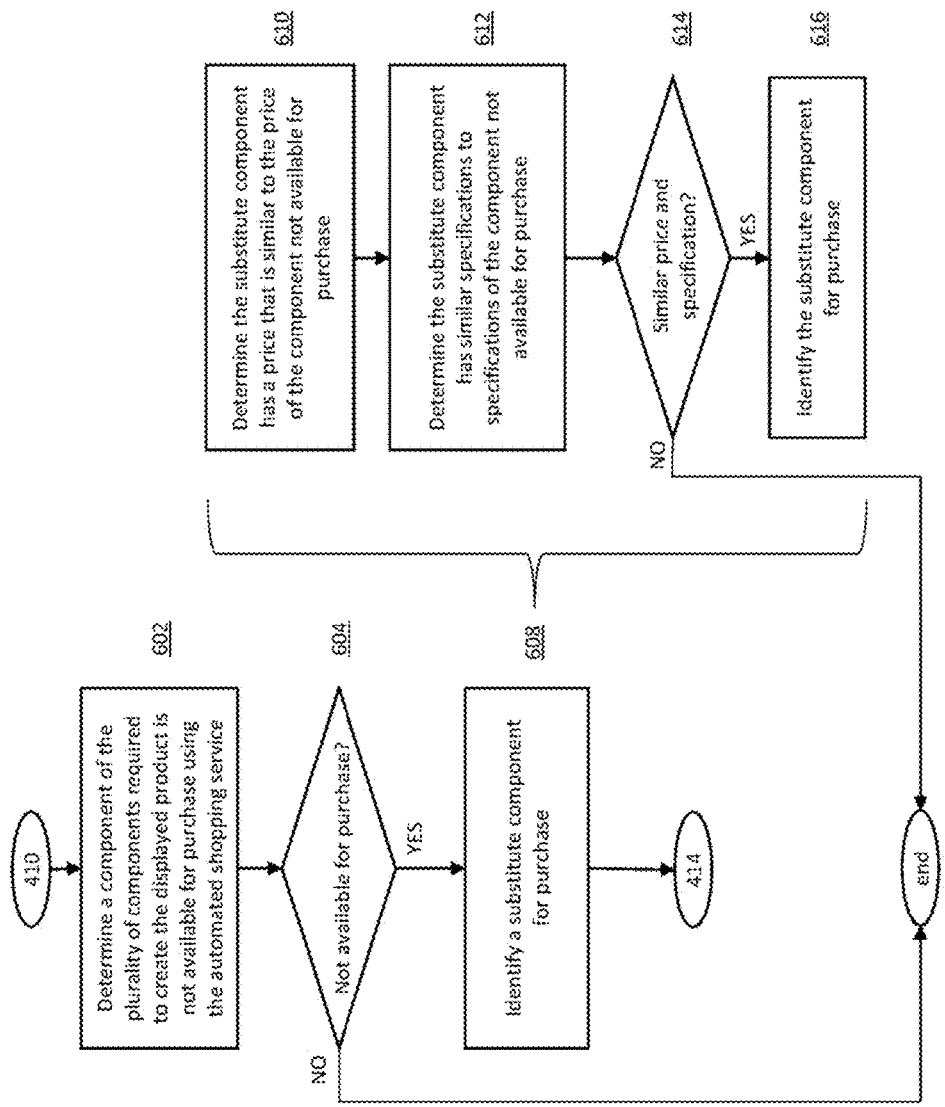
FIG. 6 is an illustrative flowchart of a process for determining that a particular subscription to the automated shopping service is available to purchase the plurality of components required to create the displayed product, in accordance with some embodiments of the disclosure.

FIG. 6 is an illustrative flowchart of a process 600 for determining that a particular subscription to the automated shopping service is available to purchase the plurality of components required to create the displayed product, in accordance with some embodiments of the disclosure. At 602, the product ordering server, by control circuitry 304, determines if a component of the plurality of components required to create the displayed product is unavailable for purchase using the automated shopping service. In some embodiments, the product ordering server retrieves information from a subscription to an automated shopping service 214 through an I/O path 306 regarding the inventory of the required components. If, at 604, control circuitry 304 determines "No," a component of the plurality of components required to create the displayed product is available for purchase using the automated shopping service, the process advances to End.

If, at 604, control circuitry 304 determines "Yes," a component of the plurality of components required to create the displayed product is unavailable for purchase using the automated shopping service, the process advances to 608. At 608, the product ordering server, by control circuitry 304, identifies a substitute component for purchase. In some embodiments, the product ordering server retrieves information regarding substitute components from a subscription to an automated shopping service 214 through an I/O path 306. In some embodiments, at 610, the product ordering server, by control circuitry 304, determines the substitute component has a price that is similar to the price of the component unavailable for purchase. At 612, the product ordering server, by control circuitry 304, determines if the substitute component has similar specifications to specifications of the component unavailable for purchase. If, at 614, control circuitry 304 determines "No," a similar specification to the specification of the component unavailable for purchase and the similar price to price of the component unavailable for purchase is not met, then the process advances to End. However, if, at 614, control circuitry 304 determines "Yes," a similar specification to specification of the component unavailable for purchase and the similar price to price of the component unavailable for purchase is met, then the process advances to 616. At 616, the product ordering server, by control circuitry 304, identifies the substitute component for purchase.

Figure 7:
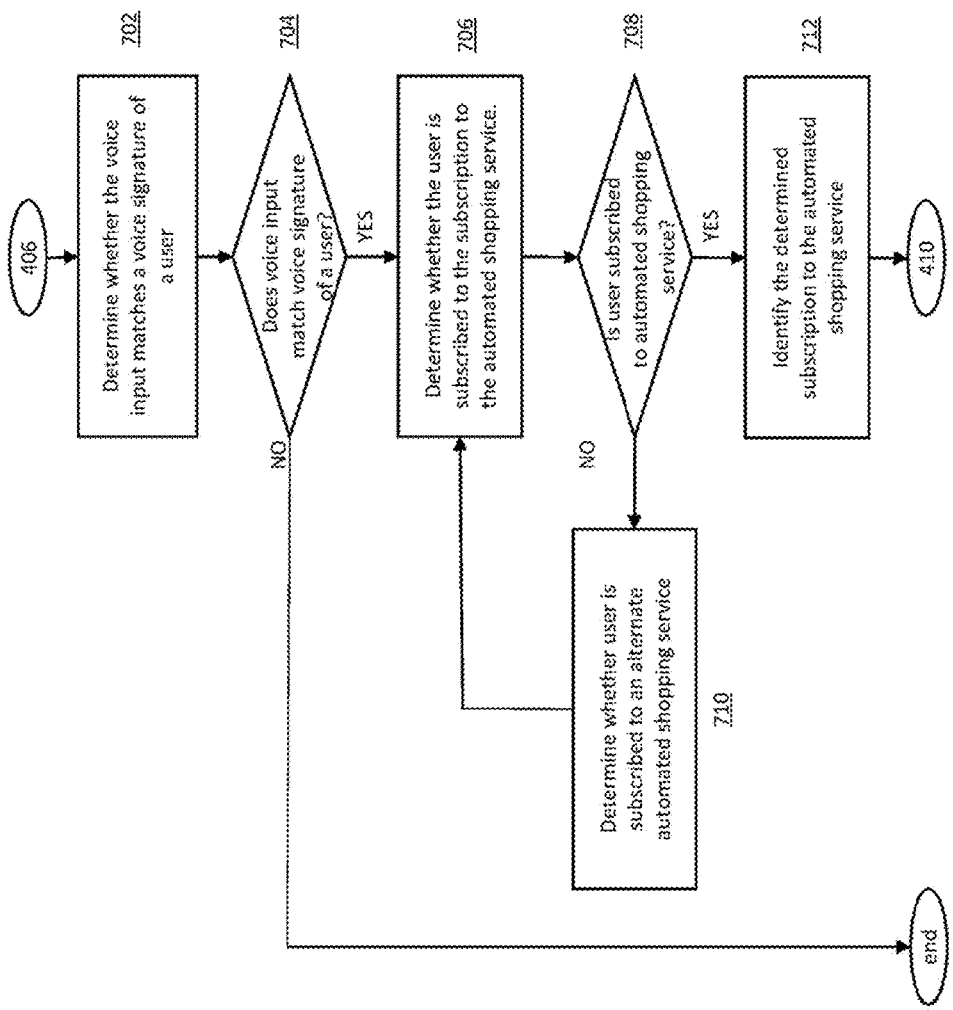
FIG. 7 is an illustrative flowchart of a process for identifying a subscription to an automated shopping service, in accordance with some embodiments of the disclosure.

FIG. 7 is an illustrative flowchart of a process 700 for identifying a subscription to an automated shopping service, in accordance with some embodiments of the disclosure. At 702, the product ordering server, by control circuitry 304, determines whether the voice input matches a voice signature of a user. In some embodiments, the product ordering server retrieves an acoustic profile of user voice signatures from an associative data structure 204 through the I/O path 306. If, at 704, control circuitry 304 determines "No," the voice input does not match the voice signature of the user, then the process advances to End.

If, at 704, control circuitry determines "Yes," the voice input matches the voice signature of the user, then the process continues to 706. At 706, the product ordering server, by control circuitry 304, determines whether the user is subscribed to the subscription to the automated shopping service. In some embodiments, the product ordering server retrieves information regarding user subscription from an automated shopping service 214 through an I/O path 306. If, at 708, control circuitry 304 determines "No," the user is not subscribed to the subscription to the automated shopping service, then the process continues to step 710. At 710, the product ordering server, by control circuitry 304, determines that the user is subscribed to an alternate automated shopping service and the process reverts to step 706.

If, at 708, control circuitry 304 determines "Yes," the user is subscribed to the subscription to the automated shopping service, then the process continues to step 712. At 712, the product ordering server, by control circuitry 304, identifies the determined subscription to be the automated shopping service.

It is contemplated that the steps or descriptions of FIGS. 4-7 may be used with any other embodiment of this disclosure. In addition, the steps and descriptions described in relation to FIGS. 4-7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 2, 3A, and 3B could be used to perform one or more of the steps in FIGS. 4-7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    storing, using a storage circuitry, data identifying a subscription to an automated shopping service associated with a user profile;
    receiving, using a control circuitry, a plurality of orders for products placed by the user profile via the subscription to the automated shopping service;
    storing, using the storage circuitry, information from the plurality of orders placed by the user profile in a database that identifies time of purchase and product information for each order of the plurality of orders;
    receiving, using a microphone, an input during displaying of media content;
    tagging, using the control circuitry, the input with a timestamp indicative of a time period when the input was received;
    identifying the time period based on the timestamp of the input;

determining, using the control circuitry, that the input comprises an indication of interest in a displayed product in the media content, by:
    querying a server for metadata of the media content that was determined to be generated for display when the input was received; and
    determining, based on the metadata of the media content received from the server that the product was displayed during the identified time period;
identifying, using the control circuitry, a set of components required to create the displayed product;
for each particular component of the set of components:
    searching the database for an entry that identifies the particular component and comprises an identification of time of purchase that is within a threshold time period of the receiving the input during displaying of the media content;
    in response to finding the entry that identifies the particular component and comprises the identification of time of purchase that is within the threshold time period of the receiving the input during displaying of the media content, reducing the set of components by excluding the particular component from the set of components; and
automatically, using the control circuitry, placing an order for the reduced set of components via the subscription to the automated shopping service without receiving additional input.

2. The method of claim 1, wherein the automatically placing the order for the reduced set of components via the subscription to the automated shopping service without receiving additional input further comprises:
    retrieving, using the control circuitry, a delivery address associated with the subscription to the automated shopping service from the database; and
    automatically transmitting, using the control circuitry, instructions to a delivery service to deliver the reduced set of components to the retrieved delivery address.

3. The method of claim 2, further comprising:
    transmitting, using the control circuitry, an instant message to the user profile of the subscription to the automated shopping service confirming delivery of the reduced set of components to the delivery address.

4. The method of claim 1, wherein the input during displaying of the media content comprises one or more of (a) a voice input, (b) a biometric input, and (c) a facial expression of a user.

5. The method of claim 4, wherein the voice input comprises an excited utterance or an instruction to purchase the displayed product.

6. The method of claim 1, wherein the identifying, using the control circuitry, the set of components required to create the displayed product comprises:
    retrieving, using the control circuitry, the metadata of the displayed product in the media content; and
    identifying, using the control circuitry, the set of components based on the metadata of the displayed product.

7. The method of claim 1, wherein the automatically, using the control circuitry, placing the order for the reduced set of components via the subscription to the automated shopping service without receiving additional input further comprises:
    determining that the subscription to the automated shopping service is available to purchase the reduced set of components.

8. The method of claim 7, wherein the determining, using the control circuitry, that the subscription to the automated shopping service is available to purchase the set of components required to create the displayed product further comprises:
    determining that a component of the set of components required to create the displayed product is unavailable for purchase using the automated shopping service; and
    in response to the determination that the component of the set of components required to create the displayed product is unavailable for purchase, identifying, using the control circuitry, a substitute component for purchase.

9. The method of claim 8, wherein the identifying, using the control circuitry, the substitute component for purchase comprises:
    determining, using the control circuitry, the substitute component has a price that is similar to the price of the component that is unavailable for purchase of the set of components required to create the displayed product;
    determining, using the control circuitry, that the substitute component has similar specifications to specifications of the component that is unavailable for purchase of the set of components required to create the displayed product; and
    in response to the determination that the substitute component has the price that is similar and has similar specifications, identifying the substitute component for purchase.

10. A system comprising:
    storage circuitry configured to:
        store data identifying a subscription to an automated shopping service associated with a user profile;
    control circuitry configured to:
        receive a plurality of orders for products placed by the user profile via the subscription to the automated shopping service;
    wherein the storage circuitry is further configured to:
    store information from the plurality of orders placed by the user profile in a database that identifies time of purchase and product information for each order of the plurality of orders;
    wherein the control circuitry is further configured to:
        receive, using a microphone, an input during displaying of media content;
        tag, using the control circuitry, the input with a timestamp indicative of a time period when the input was received;
        identify the time period based on the timestamp of the input;
        determine that the input comprises an indication of interest in a displayed product in the media content, by:
            querying a server for metadata of the media content that was determined to be generated for display when the input was received; and
            determining, based on the metadata of the media content received from the server that the product was displayed during the identified time period;
        identify a set of components required to create the displayed product;
        for each particular component of the set of components:
            search the database for an entry that identifies the particular component and comprises an identification of time of purchase that is within a threshold time period of the receiving the input during displaying of the media content;
            in response to finding the entry that identifies the particular component and comprises the identification of time of purchase that is within the threshold time period of the receiving the input during displaying of the media content, reduce the set of components by excluding the particular component from the set of components; and automatically place an order for the reduced set of components via the subscription to the automated shopping service without receiving additional input.

11. The system of claim 10, wherein the control circuitry is further configured, when automatically placing the order for the reduced set of components via the subscription to the automated shopping service without receiving additional input, to:

retrieve a delivery address associated with the subscription to the automated shopping service from the database; and automatically transmit instructions to a delivery service to deliver the reduced set of components to the retrieved delivery address.

12. The system of claim 11, wherein the control circuitry is further configured to:

transmit an instant message to the user profile of the subscription to the automated shopping service confirming delivery of the reduced set of components to the delivery address.

13. The system of claim 10, wherein the input during displaying of the media content comprises one or more of (a) a voice input, (b) a biometric input, and (c) a facial expression of a user.

14. The system of claim 13, wherein the voice input comprises an excited utterance or an instruction to purchase the displayed product.

15. The system of claim 10, wherein the control circuitry is further configured, when identifying the set of components required to create the displayed product, to:

retrieve the metadata of the displayed product in the media content; and identify the set of components based on the metadata of the displayed product.

16. The system of claim 10, wherein the control circuitry is further configured, when automatically placing the order for the reduced set of components via the subscription to the automated shopping service without receiving additional input, to:

determine that the subscription to the automated shopping service is available to purchase the reduced set of components.

17. The system of claim 16, wherein the control circuitry is further configured, when determining that the subscription to the automated shopping service is available to purchase the set of components required to create the displayed product, to:

determine that a component of the set of components required to create the displayed product is unavailable for purchase using the automated shopping service; and in response to the determination that the component of the set of components required to create the displayed product is unavailable for purchase, identify a substitute component for purchase.

18. The system of claim 17, wherein the control circuitry is further configured, when identifying the substitute component for purchase, to:

determine that the substitute component has a price that is similar to the price of the component that is unavailable for purchase of the set of components required to create the displayed product;

determine that the substitute component has similar specifications to specifications of the component that is unavailable for purchase of the set of components required to create the displayed product; and in response to the determination that the substitute component has the price that is similar and has similar specifications, identify the substitute component for purchase.

19. A non-transitory computer-readable medium having instructions encoded thereon that when executed by the control circuitry causes the control circuitry to:

store data identifying a subscription to an automated shopping service associated with a user profile;

receive a plurality of orders for products placed by the user profile via the subscription to the automated shopping service;

store information from the plurality of orders placed by the user profile in a database that identifies time of purchase and product information for each order of the plurality of orders;

receive, using a microphone, an input during displaying of media content;

tag the input with a timestamp indicative of a time period when the input was received;

identify the time period based on the timestamp of the input determine that the input comprises an indication of interest in a displayed product in the media content, by querying a server for metadata of the media content that was determined to be generated for display when the input was received; and determining, based on the metadata of the media content received from the server that the product was displayed during the identified time period;

identify a set of components required to create the displayed product;

for each particular component of the set of components:

search the database for an entry that identifies the particular component and comprises an identification of time of purchase that is within a threshold time period of the receiving the input during displaying of the media content;

in response to finding the entry that identifies the particular component and comprises the identification of time of purchase that is within the threshold time period of the receiving the input during displaying of the media content, reduce the set of components by excluding the particular component from the set of components;

automatically place an order for the reduced set of components via the subscription to the automated shopping service without receiving additional input.

20. The non-transitory computer readable medium of claim 19, wherein the input during displaying of the media content comprises one or more of (a) a voice input, (b) a biometric input, and (c) a facial expression of a user.

* * * * *